United States Patent [19]

Nagaoka et al.

[11] Patent Number: 5,049,645
[45] Date of Patent: Sep. 17, 1991

[54] PREPARATION METHOD OF AMINO RESIN PARTICULATE HAVING NARROW PARTICLE SIZE DISTRIBUTION

[75] Inventors: Muneo Nagaoka, London, United Kingdom; Saburo Hayano, Yokohama, Japan

[73] Assignee: Mitsui Toatsu Chemicals, Inc., Tokyo, Japan

[21] Appl. No.: 495,695

[22] Filed: Mar. 12, 1990

[30] Foreign Application Priority Data

Mar. 14, 1989 [JP] Japan .................................. 1-059685

[51] Int. Cl.⁵ .............................................. C08G 12/06
[52] U.S. Cl. ..................................... 528/230; 528/232; 528/242; 528/245; 528/248; 528/254; 528/256; 528/258; 528/268; 528/499; 528/502
[58] Field of Search ............... 528/230, 232, 242, 245, 528/248, 254, 256, 258, 268, 499, 502

[56] References Cited

U.S. PATENT DOCUMENTS

| | | | |
|---|---|---|---|
| 4,188,268 | 2/1980 | Sugahara | 204/2.1 |
| 4,324,768 | 4/1982 | Sugahara et al. | 423/92 |
| 4,652,270 | 3/1987 | Sadler, III | 44/280 |
| 4,832,866 | 5/1989 | Schulz et al. | 252/321 |

FOREIGN PATENT DOCUMENTS

| | | |
|---|---|---|
| 51-13491 | 4/1976 | Japan . |
| 53-7476 | 3/1978 | Japan . |
| 54-135893 | 10/1979 | Japan . |
| 61-115921 | 6/1986 | Japan . |
| 63-159596 | 7/1988 | Japan . |

*Primary Examiner*—John Kight, III
*Assistant Examiner*—Sam A. Acquah
*Attorney, Agent, or Firm*—Burns, Doane, Swecker & Mathis

[57] ABSTRACT

A continuous preparation method of an amino resin particulate having a maximum particle size of 40 μm or less and an average particle size of from 5 to 15 μm is described. The method comprises the steps of reacting amino compounds with aldehydes in the presence of an acid catalyst in an aqueous solution to form a solid product and classifying said solid product in the form of a slurry with a combination of at least two grinders and at least two classifiers.

4 Claims, 1 Drawing Sheet

PREPARATION METHOD OF AMINO RESIN PARTICULATE HAVING NARROW PARTICLE SIZE DISTRIBUTION

BACKGROUND OF THE INVENTION a) Field of the Invention

The present invention relates to a method for continuously preparing an amino resin particulate having narrow particle size distribution.

The amino resin particulate having narrow particle size distribution can be used as fillers of rubber and plastics, organic pigments for coating compounds and as fillers of papers for improving printability and optical properties such as opacity and brightness of paper.

In particular, in the case of using the amino resin particulate having narrow particle size destribution as a filler of thin papers, one pass retention in the papers becomes superior compared with inorganic fillers and essential performance of the resin particle can be maintained without further pulverization to finer mesh even in a super calender treatment conducted in the final processing step of paper making.

b) Description of the Prior Art

It has been well known that condensation reaction of amino compounds and aldehydes is carried out in the presence of an acid catalyst to form a solid product and the solid product is then crushed and classified to prepare aggregates of particulates.

Japanese Patent Publication No. 13491 (1976) discloses that ureas or phenols and formaldehyde, or prepolymers derived from these raw materials are reacted in the presence of a protective colloid and an acid catalyst to obtain an aggregate having a particle size of 1 to 50 $\mu$m. The aggregate can be used in order to provide various color developers of resin with desired flatting efficiency and tone.

Japanese Patent Publication No. 7476/1978 describes a method for preparing cured amino resin particulates by the formation of particles using the reaction of melamine or ureas with aldehydes. It is also disclosed that the average particle size of the cured resin is 10 $\mu$m or less and the resin particulates can be used for an organic pigment as such or after coloring.

Japanese Patent Laid-Open No. 115921/1986 teaches that a solid product of a crosslinked urea-formaldehyde resin is converted to a slurry and then milled with an impact grinder to obtain particles useful for fillers of papers. In this, particles of the crosslinked urea-formaldehyde polymer, each particle having an average particle size of 0.1 to 1.0 $\mu$m (hereinafter referred to as a primary particle) aggregates to form a particle having an average particle size of 1 to 30 $\mu$m (hereinafter referred to as a secondary particle). The quality of paper products can be improved by the addition of the secondary particle to papers.

In the above prior arts, merely the average particle size of the secondary particle is described on the cured resin in many cases. For example, a nominal average particle size of 10 $\mu$m has often contained large particles having maximum diameter of more than 60 $\mu$m or a fairly large portion of small particles having a diameter of 3 $\mu$m or less. Thus, considerable variation has been found on the particle size distribution depending upon the production conditions of the particles.

Japanese Patent Laid-Open No. 159596/1988 describes that a crosslinked urea-formaldehyde polymer having a specific particle size distribution of the secondary particle exhibits excellent performance toward paper products as compared with conventional polymers having a broader particle size distribution.

However, it has been desired to establish a production method of polymers having further preferred particle size distribution.

SUMMARY OF THE INVENTION

The object of the invention is to provide a continuous production method of an amino resin particle having a preferred particle size distribution, in view of the fact that the particle size distribution of the resin has a marked effect on the resin retention in a sheet of pulp slurry and improvement of paper properties when the cured amino resin is added in particular to the pulp slurry as a filler in a paper making process.

The aspect of the invention is a continuous preparation method of an amino resin particulate having a maximum particle size of 40 $\mu$m or less and an average particle size of 5 to 15 $\mu$m, comprising the steps of reacting an amino compound with an aldehyde in the presence of an acid catalyst in an aqueous solution to form a solid product and classifying said solid product in the form of a slurry with a combiantion of at least two grinders and at least two classifiers.

The grinders for use are ball mills and/or impact grinders. The classifiers for use are vibrating sieves and/or liquid cyclones. In particular, preferred classifier is three fractional classification type liquid cyclones in the secondary classification.

The method can continuously and efficiently produce the amino resin particulates having a maximum particle size of 40 $\mu$m or less and an average particle size of 5 to 15 $\mu$m.

BRIEF DESCRIPTION OF THE DRAWINGS

In FIGS. 1 and 2, 1 is top nozzle, 2 is middle nozzle, 3 is inlet part, and 4 is bottom nozzle.

DETAILED DESCRIPTION OF THE INVENTION

Figure 1:
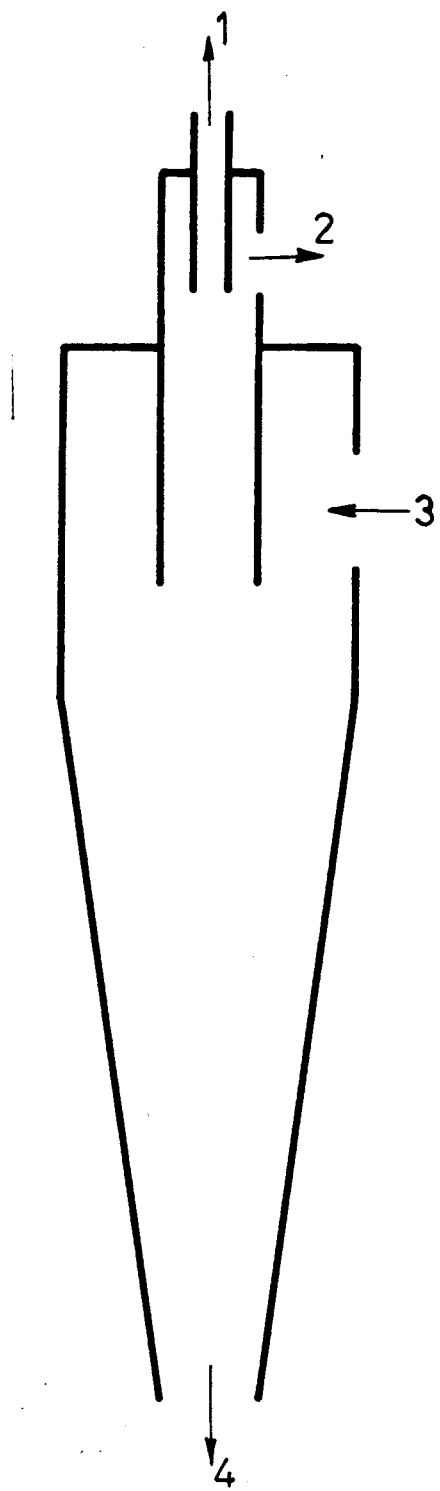
FIG. 1 is a schematic vertical sectional view of the three fractional classification liquid cyclone of this invention.
Figure 2:
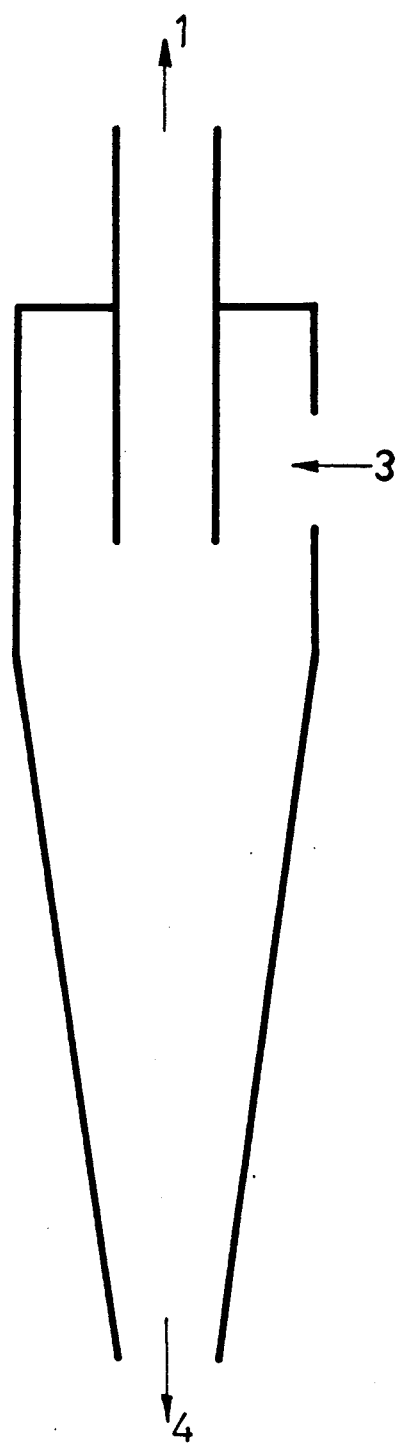
FIG. 2 is a schematic vertical sectional view of a conventional liquid cyclone.

In the method of this invention for preparing an amino resin particulate having a narrow particle size distribution, a mixture of an amino compound and an aldehyde or a prepolymer obtained by partial reaction of said mixture is reacted in the presence of an acid catalyst and the resulting solid product is efficiently ground to obtain a narrow particle size distribution by regulating the conditions with a suitable combination of grinding and classification steps.

The amino compound for use in the invention includes, for example, urea, thio urea, melamine, dicyandiamide, guanidine, acetoguanamine, benzoguanamine and spiroguanamine.

Exemplary aldehydes include formaldehyde, paraformaldehyde, acetaldehyde, glyoxal and furfural.

Representative examples of the catalyst for use in the reaction of the amino compound with the aldehyde include mineral acis such as sulfuric acid, phosphoric acid, hydrochloric acid and nitric acid; organic acids such as formic acid, oxalic acid, maleic acid, succinic acid and chloroacetic acid; and acidic compounds such as sulfamic acid, ammonium hydrogen sulfate, methyl ammonium hydrogen sulfate, ethyl ammonium hydrogen sulfate, and hydroxyl ethyl ammonium hydrogen sulfate.

As to the method for preparing the solid product by reacting the amino compound with the aldehyde, (A) a method for directly reacting the raw materials in the presence of the acid catalsyt, and (B) a method for previously reacting the amino compound with the aldehyde to obtain a prepolymer and then preparing the solid product by the addition of the acid catalyst, are disclosed in Japanese Patent Laid-Open No. 135893/1979.

In addition, water soluble organic high molecular compounds having a protecting colloidal action (hereinafter referred to as protective colloid) may also be used in order to obtain the amino resin particulate having superior optical properties, if necessary.

Exemplary protective colloids which may be used, include natural products such as starchs, sodium alginate and casein; and synthetic polymers such as methyl cellulose, ethyl cellulose, carboxymethyl cellulose, $\beta$-hydroxyethyl cellulose, polyvinyl alcohol, polyvinylhydrin, polyoxyethylene alkylphenols and polyoxyethylene alcohols.

In order to apply polymers having a particle size of 50 $\mu$m or less to thin papers as recently carried out, contamination of large particle having a size of 60 $\mu$m which is produced by conventional techniques must be avoided. On the other hand, the small secondary particle having a size of 3 $\mu$m or less is often exhausted into white water without remaining in a sheet of fiber slurry in the paper making step.

As a result of extensive investigations on the particle size distribution of the secondary particle suitable for a filler of thin papers, the present inventors have found that preferred secondary particle has a maximum particle size of 40 $\mu$m and an average particle size of 5 to 15 $\mu$m, and have accordingly established a technique for controlling the particle size distribution of the secondary particle.

In order to prepare particles of 40 $\mu$m or less in a wet state by conventional techniques, it has been required to treat the slurry over prolonged period by using a ball mill, impact grinder or a medium stirring mill and then to classify the resulting slurry by using a screen finer than 325 mesh.

Extended period of grinding can eliminate large particles, however, most of the particles are also subjected to grinding treatment excessively and the size of many particles become smaller than expected.

Prolonged period of grinding treatment with a ball mill or a medium stirring mill in particular also causes wear of the medium by mutual collision. The impurity thus generated contaminates the resin particulates and the slurry of the resin is often colored.

The vibrating sieve used for removing the large particles remained after grinding treatment is required to provide with a screen having at least 325 mesh (sieve opening is 44 $\mu$m) to eliminate particles larger than 40 $\mu$m. However, filtration performance becomes extremely poor in such case and it has hence been required to extend filtration area or to decrease concentration of the slurry to be classified.

Further, application of a fine screen leads to use of small wire diameter of the screen and results in shorter service life of the screen. Specific skill is also demanded to furnish a uniform screen.

The present inventors have carried out an intensive investigation to overcome the above problems. As a result, it has been found that the resin particulates having an average particle size of 5 to 15 $\mu$m and a maximum particle size of 40 $\mu$m or less can be effectively produced without generation of smaller particles due to excessive grinding by treating the resin with a combination of a plurality of grinding and classifying steps. It has also been found that production efficiency can be maintained almost the same level as the conventional method.

Primary grinding is conducted by using mills for preparing relatively large particles such as a hammer mill or a jaw crusher.

In these kinds of grinders, an impact grinder has the highest efficiency for the treatment. Much amount of particles having sizes of 40 $\mu$m is contained in the particle size distribution of the ground resin. However, the content of particles having a size of 3 $\mu$m or less is not more than several percents, which result has proved difficulty for generating fine particles.

Consequently, the resin slurry after primary grinding treatment is not directly subjected to the secondary grinding step. The resin slurry is classified (hereinafter referred to as primary classification) on the basis of about 150 $\mu$m in particle size. The primary classification is important in view of reducing the grinder load in the secondary grinding step and preventing excess pulverization of particles after secodnary grinding treatment.

The primary classification is suitably carried out by a vibrating sieve equipped with a screen of about 100 mesh or a common liquid cyclone.

The common liquid cyclone means a type where original liquid is pressed into the cyclone, divided into two fractions and discharged from the cyclone. The type is generally used for the separation of substances having different specific gravity from a liquid mixture containing the substances or for the separation of a portion containing a relatively large particle size and a portion containing a relatively small particle size.

The portion containing much amount of large particles discharged from the primary classification treatment is transferred to the secondary grinding step. The slurry containing much amount of small particles is bypassed the secondary grinding step as such and transferred to the secondary classification step.

In the secondary grinding step, the whole particles are desired to have a size of 40 $\mu$m or less. However, it is required to prevent generation of small particles due to excessive grinding. The term "small particles" in the invention means particles having a size of 3 $\mu$m or less.

The preferred grinders for use in the secondary grinding step are those having a specification for preparing finer particles in the impact type grinders. The preferred grinders are a ball mill and a pin mill type grinder.

In the case of using the ball mill, the concentration of the resin slurry must be increased in order to prevent wear of the medium due to mutual contact as completely as possible. It must also be considered that the resulting particle size distribution varies depending upon the size of the medium.

In the case of using the pin mill type grinder, retention time of the resin slurry in the grinder is short. Hence, it is necessary to carry out grinding by recycling the resin slurry or to conduct the third grinding treatment by using a further pin mill. The system is most suitable in view of productivity. However, application of more than three grinders of the same type has no merit on the production.

The resin slurry after the secondary or the third grinding is then subjected to the secondary classification step.

In the step, the vibrating sieve and the common liquid cyclone used in the primary classification can also be applied. However, the particle size of the resin in the feeding slurry is smaller than that of the primary classification. Thus, a screen finer than 325 mesh must be used in the case of vibrating sieve. In addition, it is necessary to decrease the concentration of the resin slurry or to extend the filtration area in order to enhance classification efficiency. On the other hand, in the case of using the common liquid cyclone, the concentration of the resin slurry must be considerably decreased or peripheral speed of the slurry in the cyclone must be sufficiently raised, because the specific gravity of the resin is close to water used for the dispersion medium.

The present inventors have carried out an extensive investigation on the classification. As a result, it has been found that a three fractional classification type liquid cyclone is most effective for the secondary classification treatment. In the three fractional classification type liquid cyclone used in the present invention, the slurry to be classified is pressed into the cyclone and a part of the slurry composed mostly of small particles or particles of low specific gravity is discharged from the top nozzle as in a common liquid cyclone (two fractional classification type). The characteristic of the former cyclone is a zone where the central portion of the discharging slurry is separated by another nozzle to selectively collect slurry portion containing further small particles.

The three fractional classification type liquid cyclone can collect smaller particles in the same slurry concentration as compared with the common cyclone. Such type of cyclone is marketed, for example, from Ohishi Kikai Seisakusho Co., Ltd. in Shizuoka City.

FIG. 1 illustrates a schematic drawing of the three fractional classification type liquid cyclone. The slurry fed from the inlet part 3 goes down along the internal wall with spiral rotation. A portion of the slurry containing much amount of large particles was discharged from the outlet part 4 and the other portion containing much amount of smaller particles constitutes a spiral vortex which rises up in the central part of the cyclone.

The spiral vortex is discharged from the upper part of the cyclone. At this stage, a portion containing further small particles is collected through a fine nozzle 1 which is inserted in the center. The particle size distribution of the slurry discharged from the outlet part 2 is similar to that of the feeding liquid charged from the inlet part 3.

The slurry discharged from the outlet part 2 is mixed with the feeding slurry.

In summary, cured resin is crushed, as a primary grinding treatment, by using an impact grinder such as a hammer mill which is ordinarily used for grinding into relatively coarse particles. The crushed resin is then classified into a portion containing large particles and another portion containing small particles by using a common liquid cyclone or a vibrating sieve (primary classification).

In the next step, the slurry containing large particles is subjected to the secondary grinding treatment by using an impact grinder such as a pin mill or a ball mill. The ground slurry thus obtained is mixed with the slurry which is obtained in the primary classification and contains small particles. The mixture is subjected to the secondary classification by using the same classifier as used in the primary classification treatment or the three fractional classification type liquid cyclone. Thus, particles having a size of 40 μm or less are obtained.

The particles obtained by the method of the invention have a size distribution that the average particle size is from 5 to 15 μm, maximum particle size is 40 μm or less, and particles of 3 μm or less in size is in a small amount.

The method of the present invention can prepare particles having a narrower size distribution than conventional methods and is nevertheless advantageous in that productivity is almost equal.

EXAMPLE

The present invention will hereinafter be illustrated further in detail by way of examples and comparative examples; however, these examples are intended to illustrate the invention and are not to be construed to limit the scope of the invention.

The particle size of the resin is determined by using a laser beam particle size distribution measuring apparatus (Microtrack Model RSA) unless otherwise noted. Percent and part are on the bases of weight unless otherwise noted.

EXAMPLE 1

A solution was prepared by mixing 37.9 parts of a 37% aqueous formaldehyde solution, 21.6 parts of urea, 0.5 part of carboxymethylcellulose and 40 parts of water. The solution was reacted at pH 7 for 2 hours at 70° C. to obtain a prepolymer.

Then 100 parts of the prepolymer thus obtained were mixed with 100 parts of 2% sulfuric acid to obtain a solid product. The solid product will hereinafter referred to as solid urea resin.

The solid urea resin was subjected to a primary grinding treatment with a hammer mill, neutralized and mixed with water to obtain a slurry having a solid content of 8% which is referred to as Sample 1. Sample 1 was sieved with a 100 mesh screen. The oversize portion was 46.5%. The undersize portion had an average particle size of 29.4 μm and contained 2.3% of particles having 3 μm or less in size.

Sample 1 was classified with a vibrating sieve having a 100 mesh stainless screen as a primary classification. Then the oversize portion obtained was subjected to the secondary grinding treatment by using a pin mill (Nara Free Grinder, Model M-6) and mixed with the undersize portion obtained in the primary classification. The slurry mixture obtained was subjected to the secondary classification treatment by using a three fractional classification type liquid cyclone (Model; TR-10, a product of Ohishi Kikai Seisakusho Co., Ltd.). The treatment was carried out at a feeding rate of 11 l/min under feeding pressure of 6 kg/cm$^2$.

Results on the secondary classification treatment are illustrated in Table 1. In the table, one pass retention indicates proportion by weight (%) of the resin remained in the paper to the amount added, when the amino resin obtained by the treatment is added to the pulp slurry and paper making is carried out without utilizing the generated white water. One pass retension is calculated by the following equation.

$$\text{One pass retension} = \frac{Y}{X} \times 100(\%)$$

wherein X is proportion (%) of resin added per amount of pulp in the slurry, and $$Y = \frac{A - B}{C} \times 100$$

wherein
A is Nitrogen content (%) in the paper
B is Nitrogen content (%) in the pulp
C is Nitrogen content (%) in the resin added.
Nitrogen content is analyzed by Kjeldahl method.

EXAMPLE 2

The same procedures as conducted in Example 1 were carried out except that a vibrating sieve having a 340 mesh screen was used for the secondary classification in place of the three fractional classification type liquid cyclone and the concentration of the slurry was diluted to 5.5% by the addition of water. Results are illustrated in Table 1.

EXAMPLE 3

A solution was prepared by mixing 17.33 parts of a 37% aqueous formaldehyde solution, 0.81 part of n-butylaldehyde, 0.33 part of carboxymethyl cellulose and 20 parts of water, and pH was adjusted to 7.5.

Then 4.26 parts of urea, 5.97 parts of melamine, and 3.92 parts of water were added to the solution and reacted for 2 hours at 70° C. The reaction mixture was cooled to 45° C. and 24.4 parts of 4% sulfuric acid were added to the reaction mixture to obtain a solid product containing 40% by mole of melamine. The product will be referred to as solid melamine resin.

The solid melamine resin was subjected to the primary grinding treatment and converted to slurry by the same procedures as conducted in Example 1. The slurry obtained is referred to as Sample 2.

Sampel 2 was sieved with a 100 mesh screen. The over-size portion was 29.1%. The undersize portion had an average partricle size of 28.6 μm and contained 1.9% of particles having 3 μm or less in size.

Sample 2 was subjected to the primary classification treatment, secondary grinding, and the secondary classification treatment as conducted in Example 1 and the results obtained are illustrated in Table 1.

EXAMPLE 4

The same procedures as conducted in Example 2 were carried out on Sample 2, and the results obtained are illustrated in Table 1.

COMPARATIVE EXAMPLE 1

The whole amount of Sample 1 which was prepared in Example 1 was subjected to the secondary grinding by using a pin mill without carrying out the primary classification treatment. The product obtained was then subjected to the secondary classification treatment by using the three classification type liquid cyclone under the same conditions as conducted in Example 1. Results are illustrated in Table 1.

COMPARATIVE EXAMPLE 2

The same procedures as conducted in Comparative Example 1 were carried out except that Sample 2 was used in place of Sample 1. Results are illustrated in Table 1.

COMPARATIVE EXAMPLE 3

The same procedures as conducted in Example 1 were carried out except that a common two fractional type liquid cyclone (Model T-10; a product of Ohishi Kikai Seisakusho Co., Ltd.) having the same dimensions in length and diameters as the three fractional type liquid cyclone was used in the secondary classification step. Results are illustrated in Table 1.

COMPARATIVE EXAMPLE 4

The same procedures as conducted in Comparative Example 3 were carried out except that Sample 2 was used in place of Sample 1. Results are illustrated in Table 1.

REFERENCE EXAMPLE

A primary grinding test was carried out by using the solid urea resin prepared in Example 1. The grinders used were a ball mill, vibrating ball mill, roller mill, planetary mill (zego mill), domestic juicer mixer, Hendchel type mixer, disc refiner, pin mill, colloid mill and a medium stirring mill. Results are illustrated in Table 2.

TABLE 1

| | Slurry before treatment | | Solid in slurry after treatment | | | Time required for treating 1 kg of solid (min) | Remarks | One pass retention (%) |
|---|---|---|---|---|---|---|---|---|
| | Concentration (%) | Viscosity (cps/25° C.) | Average particle size (μm) | 40 μm or more (%) | 3 μm or less (%) | | | |
| Example 1 | 8.0 | 32.2 | 8.8 | 0 | 1.2 | 7 | | 72.1 |
| Example 3 | 8.0 | 28.5 | 6.3 | 0 | 0.8 | 6 | | 69.8 |
| Example 2 | 5.5 | 5 | 9.4 | 0 | 1.6 | 48 | Vibrating sieve (diameter/m) is used. | 70.9 |
| Example 4 | 5.5 | 5 | 8.2 | 0 | 1.1 | 46 | The same as above. | 70.3 |
| Comparative Example 1 | 8.0 | 32.2 | 7.6 | 0 | 17.8 | 7 | Particles are excessively ground. | 52.3 |
| Comparative Example 2 | 8.0 | 28.5 | 5.5 | 0 | 23.5 | 7 | The same as above. | 48.6 |
| Comparative Example 3 | 8.0 | 32.2 | 7.2 | 1.2 | 0.7 | 5 | Particle size of 40 μm or more is eliminated at 6% slurry concentration. | 72.6 |
| Comparative Example 4 | 8.0 | 28.5 | 7.9 | 0.8 | 0.4 | 5 | | 71.2 |

TABLE 2

| Type of grinder | Remarks |
|---|---|
| Ball mill | Batch grinding is possible by crushing to pulverization. Caution is needed for selection of medium. Continuous grinding remains large particles. Unsuitable for secondary grinding treatment. Unsuitable for treatment in large amount. |
| Vibrating ball mill | Resin adheres to medium surface due to narrow amplitude. Maximum amplitude is 10 cm. Results are poor. |
| Roller mill | Resin is previously crushed to 2 mm or less in order to charge between rollers. Results are poor due to insufficient tack of cake. |
| Planetary mill (zego mill) | Capacity is enough to primary grinding. Discharge of ground resin is not ready. Retention of resin causes excessive grinding. Improvement is required. |
| Domestic juicer mixer | Equal amount mixture of resin and water treated for 15 minutes gives 3-30 μm size particles. Capacity is insufficient. |
| Henschel type mixer | Large scale equipment of domestic mixer. Batch type. Power required: 300 kW/1000 kg solid resin. A type capable of simultaneous grinding and classification with partial discharge of treated product markedly reduces grindability by addition of water to solid resin. |
| Disc refiner | The same effect as pin mill. Suitable for primary grinding. Low capacity for secondary grinding because of decreased disc clearance. |
| Pin mill | Usable for primary and secondary grinding by exchange of screen in outlet port. Particle size can be reduced by extending retention time of resin in the mill. Continuous grinding by 3 mills in series is possible. Grinding by 4 or more mills is ineffective. |
| Medium stirring mill | Large medium is used for primary grinding. Small medium is required for particle size reduction. Low capacity. High operation cost (power cost, wear of parts). Suitable for high grade products. |

REFERENCE EXAMPLE 2

The resin obtained in Example 1 which contnains no particle having a size of 40 μm or more was filled on a paper in an amount of 3%. The paper was printed with a relief-printer without wiping off the dirt on the rolls. After continuously printing 7000 sheets of paper, the deposit built up on the rolls were observed and compared with the case where the paper was filled with the same amount of the resin obtained in Comparative Example 3. Results are illustrated in Table 3. The above mentioned Japanese Patent Laid-Open No. 159596/1988 has disclosed that preferred filling resin contains 4% by weight or less of particles having a size of 44 μm or more.

The results obtained suggest improvement of the filler specified in the above disclosure.

TABLE 3

| Sample | Paper surface | Roll deposit |
|---|---|---|
| Example 1 | Felt side | none |
|  | Wire side | none |
| Comparative Example 3 | Felt side | found |
|  | Wire side | found |

What is claimed is:

1. A continuous preparation method of an amino resin particulate having a maximum particle size of 40 μm or less and an average particle size of from 5 to 15 μm, comprising the steps of reacting an amino compound with an aldehyde in the presence of an acid catalyst in an aqueous solution to form a solid product and classifying said solid product in the form of a slurry with a combination of at least two grinders and at least two classifiers.

2. The preparation method of claim 1 wherein the classifier is a vibrating sieve or a liquid cyclone.

3. The preparation method of claim 1 wherein the secondary classifier is a three fractional classification type liquid cyclone.

4. The preparation method of claim 1 wherein the grinder is a ball mill or an impact grinder.

* * * * *